United States Patent
Gordon (10) Patent No.: US 7,706,158 B2
(45) Date of Patent: Apr. 27, 2010

(54) AMPLIFIER WITH SWITCHMODE POWER SUPPLY

(76) Inventor: Jay M. Gordon, 159 First St., Keyport, NJ (US) 07735

( * ) Notice: Subject to any disclaimer, the term of this patent is extended or adjusted under 35 U.S.C. 154(b) by 186 days.

(21) Appl. No.: 12/075,344

(22) Filed: Mar. 11, 2008

(65) Prior Publication Data

US 2008/0225558 A1 Sep. 18, 2008

Related U.S. Application Data

(60) Provisional application No. 60/906,291, filed on Mar. 12, 2007.

(51) Int. Cl.
*H02H 7/122* (2006.01)
*H02M 3/335* (2006.01)
(52) U.S. Cl. ............... 363/56.12; 363/21.08; 363/21.16
(58) Field of Classification Search .................. 363/20, 363/21.01, 21.08, 21.09, 21.16, 21.17, 97, 363/21.02, 56.01, 56.09, 56.11, 56.12
See application file for complete search history.

(56) References Cited

U.S. PATENT DOCUMENTS

| | | | | |
|---|---|---|---|---|
| 5,767,744 | A | 6/1998 | Irwin et al. | 330/297 |
| 6,069,803 | A * | 5/2000 | Cross | 363/21.14 |
| 6,239,584 | B1 | 5/2001 | Jang et al. | 323/222 |
| 6,735,097 | B1 | 5/2004 | Prasad et al. | 363/44 |
| 7,480,159 | B2 * | 1/2009 | Wei et al. | 363/21.18 |

OTHER PUBLICATIONS

Robert Watson, Student Member, IEEE, Guichao C. Hua, and Fred C. Lee, Fellow, IEEE, "Characterization of an Active Clamp Flyback Topology for Power Factor Correction Applications," IEEE Transactions on Power Electronics, vol. 11, No. 1, Jan. 1996, pp. 191-198.

Praneet Athalye, Dragan Maksimović, Robert Erickson, "High-Performance Front-End Converter for Avionics Applications," Colorado Power Electronics Center, Department of Electrical and Computer Engineering, University of Colorado at Boulder, Boulder, Colorado 80309-0425, USA, Proc. Power Conversion and Intelligent Motion Conference, Sep. 2001, vol. 39, issue 2, pp. 462-474.

Sang-Kyoo Han, Student Member, IEEE, Hyun-Ki Yoon, Student Member, IEEE, Gun-Woo Moon, Associate Member, IEEE, Myung-Joong Youn, Senior Member, IEEE, Yoon-Ho Kim, Senior Member, IEEE, and Kang-Hee Lee, "A New Active Clamping Zero-Voltage Switching PWM Current-Fed Half-Bridge Converter," IEEE Transactions on Power Electronics, vol. 20, No. 6, Nov. 2005, pp. 1271-1279.

Yungtaek Jang, and Milan M. Jovanović, "Isolated Boost Converters," IEEE Transactions on Power Electronics, vol. 22, No. 4, Jul. 2007, pp. 1514-1521.

(Continued)

*Primary Examiner*—Gary L Laxton
(74) *Attorney, Agent, or Firm*—Watov & Kipnes, P.C.; Kenneth Watov (57) ABSTRACT

An amplifier is driven by DC voltage from a switchmode power supply, whereby the switchmode power supply includes on the primary side a primary winding and bias supply winding. The bias supply winding supplies a reflected voltage from a secondary winding to a bias supply capacitor. The bias supply capacitor drives the control circuit and provides a sensing to the control circuit. The power supply further includes an active clamp circuit for controlling the voltage stress on a main switch. In another embodiment, boost inductors and a balancing transformer are added on the primary side of the transformer to prevent overvoltage conditions at light loads.

2 Claims, 6 Drawing Sheets

OTHER PUBLICATIONS

Wuhua Li, Jun Liu, Jiande Wu, and Xiangning He, "Design and Analysis of Isolated ZVT Boost Converters for High-Efficiency and High-Step-Up Applications," IEEE Transactions on Power Electronics, vol. 22, No. 6, Nov. 2007, pp. 2363-2374.

Liang Yan, and Brad Lehman, "An Integrated Magnetic Isolated Two-Inductor Boost Converter: Analysis, Design and Experimentation," IEEE Transactions on Public Electronics, vol. 20, No. 2, Mar. 2005, pp. 332-342.

* cited by examiner

AMPLIFIER WITH SWITCHMODE POWER SUPPLY

RELATED APPLICATION

The present invention is related to and takes priority from U.S. Provisional Patent Application Ser. No. 60/906,291, filed on Mar. 12, 2007, the teachings of which are incorporated herein to the extent they do conflict.

FIELD OF THE INVENTION

The present invention is related generally to DC power supplies, and more particularly to audio amplifiers using switchmode power supplies that use current fed topologies and employ active clamp circuitry to reduce switching losses and voltage stress.

DEFINITION OF TERMS

Power factor correction:
 Controlling the input current to the power supply such that it is proportional to the input voltage. Therefore the AC line is presented with a load resistive in character.

Single stage:
 The power supply uses only one converter to isolate the AC line from the output and supply a DC output.

Current Fed:
 The converter transformer is fed by an inductive source during the on time of the output diodes. This occurs when the primary switch turns off. Therefore no inductors are needed on the secondary side to limit the primary current.

Figure 1:
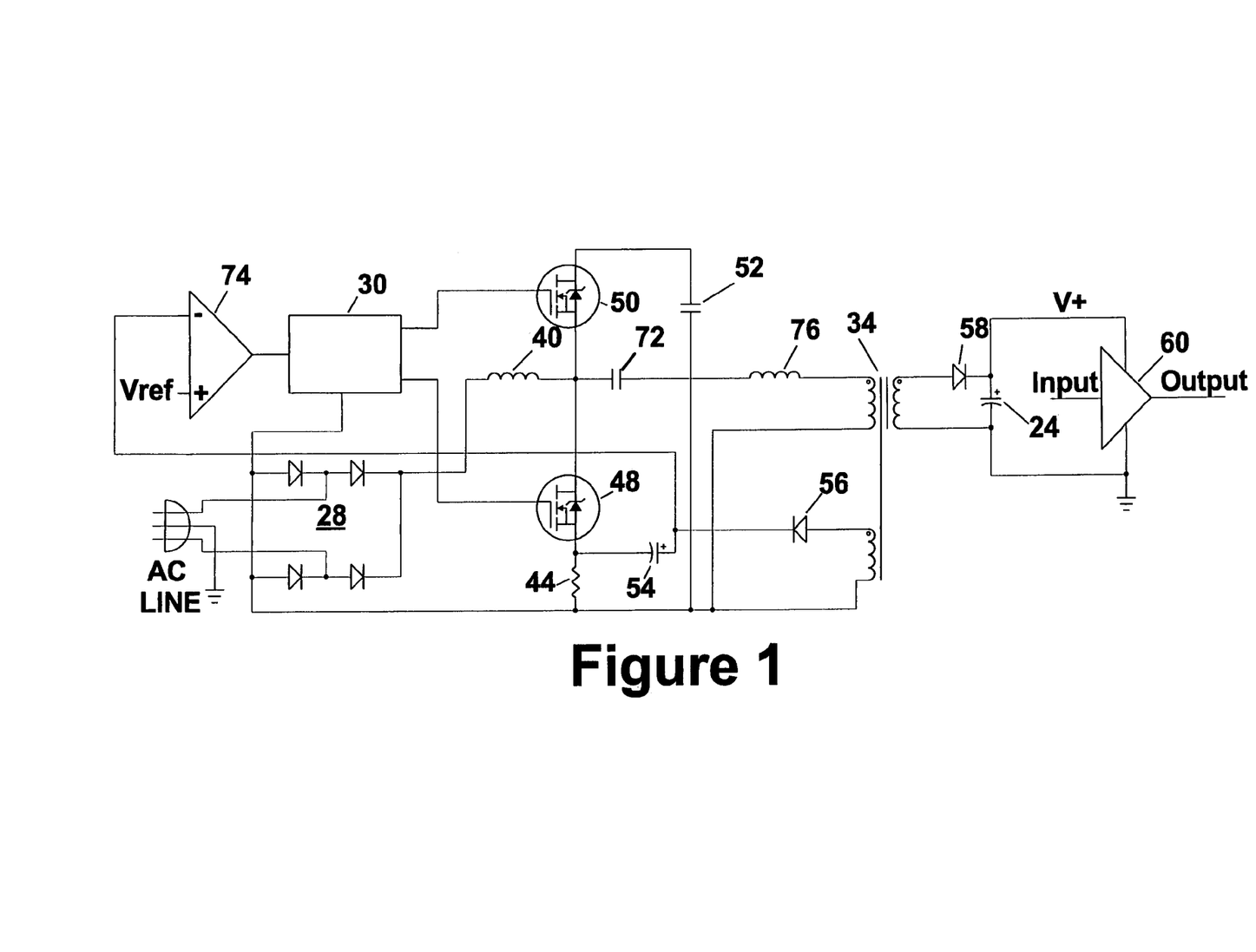
FIG. 1 is an embodiment of the invention utilizing the SEPIC topology in the power supply for an amplifier.

Active Clamp:
 An active clamp is implemented with a clamping switch connected with its source or emitter terminal in common with the drain or collector of the primary or main switch. This is shown in FIG. 1, as described below in detail. The other end of the clamping switch is connected to a clamp capacitor, which is in turn tied to an input capacitor. The active clamping technique has two benefits. One is that the energy in the leakage inductance of an associated transformer is transferred to the clamp capacitor through an antiparallel diode inherent or added to the clamping switch, thereby limiting the voltage stress seen by the main switch. Second is that by turning off the active clamp switch shortly before turning on the main switch, the current flowing from the clamp capacitor into the leakage inductance is diverted into the main switch, draining the charge stored across it. This lowers the voltage across the switch, so that turn-on losses are reduced.

Regulated Bias Supply:
 A method of supplying a bias supply to the control circuit is employed with the present invention through use of a bias winding on the transformer. Feeding this voltage through a resistive divider to a voltage error amplifier of a control circuit allows the supply to regulate its own bias supply. Regulation of the output voltage is achieved by the cross coupling of the bias supply winding and the output windings of the transformer. Because this coupling is not perfect, the output voltage will not be as highly regulated as if it was regulated directly. However, in many applications including audio amplifiers, this is actually desirable. A short circuit will cause the bias supply to drop below the under voltage cutoff point of a control IC, causing it to turn off. This provides protection against overloads and shorts without having to sense the secondary current.

BACKGROUND OF THE INVENTION

Amplifiers are used to increase the voltage and current levels of a signal in order to drive a load. All amplifiers use a power supply that supplies the energy required to perform this task. The power supply converts the AC line voltage into DC voltages suitable for the amplifier. The power supply also isolates the line voltage from the DC output voltages for safety purposes. This is accomplished by the transformer. A conventional power supply in an amplifier includes a transformer that works directly off the 60 Hz line voltage, and tends to be relatively heavy and bulky. The output of many prior art AC to DC power supplies completely unregulated, with no current limiting. In many prior such power supplies, the input current typically has a power factor of less than 0.7, not meeting most international regulations.

To resolve these problems, the use of switching power supplies was implemented. Now there was both line and load regulation, and current limiting. Power factor was still less that 0.7, and generally they could not work over the universal input voltage range of 90-265 VAC without some sort of adjustment. The supplies were implemented with voltage fed topologies such as the half bridge topology.

To remedy the switching supply problems, a boost PFC (power factor correction) stage was added to the input of the power supply. The boost stage consists of a boost inductor coupled to a boost switch. The boost stage can be controlled to yield a high power factor. The resulting supply is fully regulated, overload protected, and power factor can exceed 0.95, with a fully universal input voltage range. Unfortunately, the addition of the PFC stage reduces the efficiency of the supply. Additional circuitry is necessary to limit inrush current. It also became apparent that in many cases with audio amplifiers that the fully regulated output voltage did not sound as good as the unregulated output of the conventional supply. This may be partly due to the use of large energy storage capacitors being located in the transformer primary side of the power supply, with only small filtering capacitors on the output or secondary side. This limits the instantaneous current available to the amplifier. The added stage also increases the parts count and complexity of the design. The present invention resolves these detriments associated with known switchmode supplies while maintaining their advantages.

SUMMARY OF THE INVENTION

The foregoing objects are attained by the use of a power factor corrected, single stage, current fed, active clamped power supply. Implementations of the present invention provides for both the power factor correction function and output isolation function being performed by a DC power supply for an amplifier. This is partly accomplished by providing a means for regulating the voltage generated by a winding on the primary side of a transformer of the present amplifier power supply

BRIEF DESCRIPTION OF THE DRAWINGS

FIG. 2 is a preferred embodiment of the invention utilizing an active clamped flyback topology. It shows the bias supply consisting of a bias winding on transformer 34, bias supply diode 56, and bias supply capacitor 54 deliver power and information about the output voltage to a PWM controller 30.

DETAILED DESCRIPTION OF THE INVENTION

Figure 2:
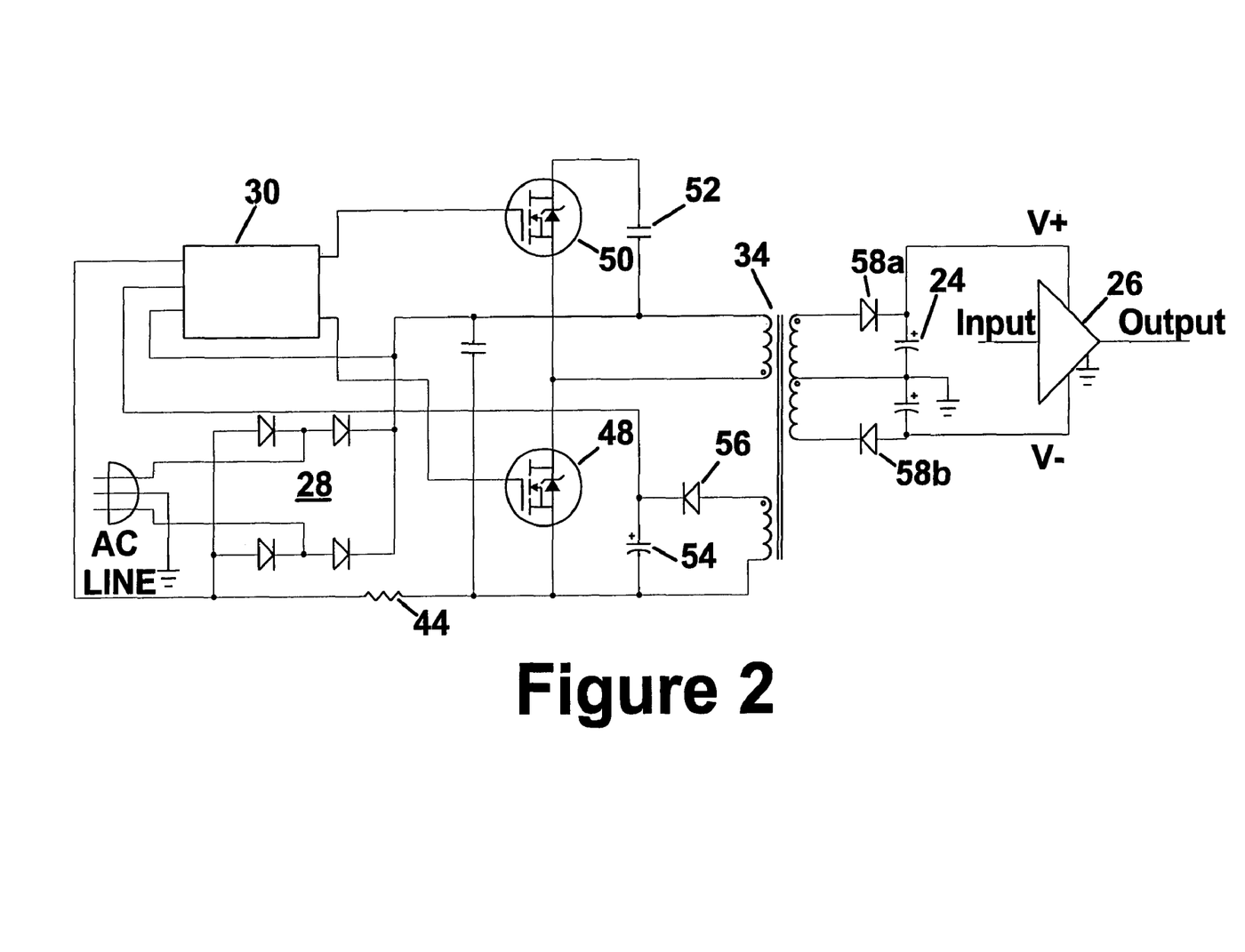
Figure 3:
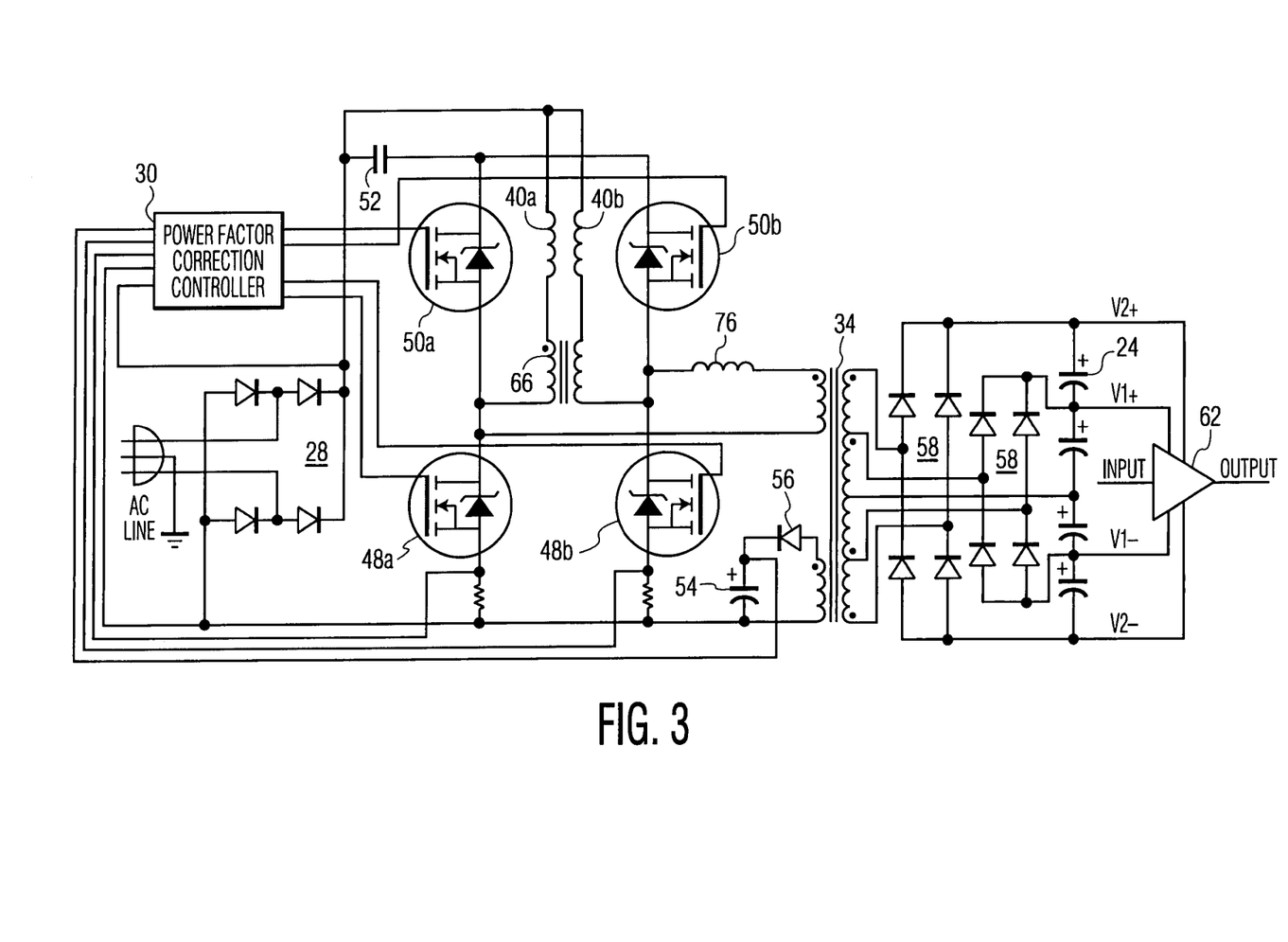
FIG. 3 is a preferred embodiment of the invention utilizing a double ended isolated boost topology with four outputs suitable for a multirail amplifier 62.

Note that when the main switch 48 (FIGS. 1 and 2) is turned off, or switches 48a and 48b (FIG. 3) are turned off, the boost inductor 40 of FIG. 1 (also magnetizing inductance of primary winding of transformer 34 of FIG. 2, and boost inductors 40a and 40b of FIG. 3), divert current into the transformer 34. The sudden rise in current through the transformer's leakage inductance will cause a large voltage spike across the main switch 48, or main switches 48a and 48b, possibly causing failure of these switches. This voltage spike can be controlled by the use of a snubber. The active clamp performs the snubber function by allowing the boost inductor 40 current to flow into the clamp capacitor 52 while the current builds up through the leakage inductance of the transformer 34 (FIG. 1). Similarly, in the embodiment of FIG. 2, the boost current flows into capacitor 52 from the primary winding of transformer 34. Similarly, in the embodiment of FIG. 3, the boost current flows into capacitor 52 from the series circuit of boost inductor 40b, balancing transformer 66, and switch 50b. The clamp capacitor 52 is sized so that the voltage increase from the boost inductor 40 current is low enough to remain within the limits of the main switch 48, of the embodiment of FIG. 1, and similarly for the embodiments of FIG. 2 and 3. Also the resonant frequency of the clamp capacitor 52 and the leakage inductance of main switch 48 should be less than the switch frequency, or the zero voltage switching feature may be lost. The problem of voltage spikes on the main switch 48 are common to all current fed topologies.

For applications such as audio amplification, perfect regulation is not necessary. The expense and space consumed by an optocoupler and its associated circuitry can be eliminated. In FIG. 1 the PWM control circuit 30 is shown sensing the voltage of its own bias supply consisting of bias supply diode 56 and bias supply capacitor 54, so that the bias supply voltage is regulated by the voltage error amplifier 74 of control circuit 30. Main switch 48 current is sensed by current sense resistor 44. This allows the PWM control circuit 30 to both provide power factor correction and protect against overload. The output voltage is indirectly regulated by means of the coupling of the secondary side windings to the primary side bias supply winding of transformer 34. Imperfections in the coupling of transformer 34 result in a sloped V-I curve for the power supply output, similar to an unregulated conventional supply. FIG. 1 shows DC blocking capacitor 72, used in SEPIC and Cuk converters to keep DC currents from flowing through the transformer 34.

In another embodiment of the invention as shown in FIG. 3, on the primary side of the transformer the double ended topology of a half bridge boost converter is used, rather than a single ended topology as in other embodiments depicted. In this manner, an isolated boost converter is provided.

Current fed topologies suited for this application are the flyback, SEPIC (Single Ended Primary Inductance Converter), Cuk, and isolated boost. Due to high peak and RMS currents the flyback converter as shown in FIG. 2 is only practical at low powers of less that 300 W using currently available devices. The SEPIC converter as shown in FIG. 1 is a single ended topology suitable for power levels up to 600 W. For higher powers the double ended or bridge type isolated boost topologies are useful. An embodiment of this topology is shown in FIG. 3. Interleaved versions of the flyback and SEPIC converters will allow increased power without corresponding increases in component current stress. The FIG. 3 embodiment is inherently interleaved.

The amplifier may be either linear or switching in operation, and may have any number of supply voltages. This is shown in FIGS. 1, 2 and 3. As the power supply topologies discussed previously are all of the current fed variety, with the inductive element on the primary side, it is easy to add voltage outputs by just adding windings to the transformer 34, as shown progressively in FIGS. 1, 2, and 3. This avoids the use as in the prior art of coupled inductors with multiple windings, necessary when using a voltage fed design. The current fed design of the present invention provides bulk energy storage capacitors 24 (see FIGS. 1 and 2) that are located at the amplifier voltage supply rails, so the amplifier 60 of FIG. 1, and amplifier 26 of FIG. 2, have full use of the stored energy.

Figure 4:
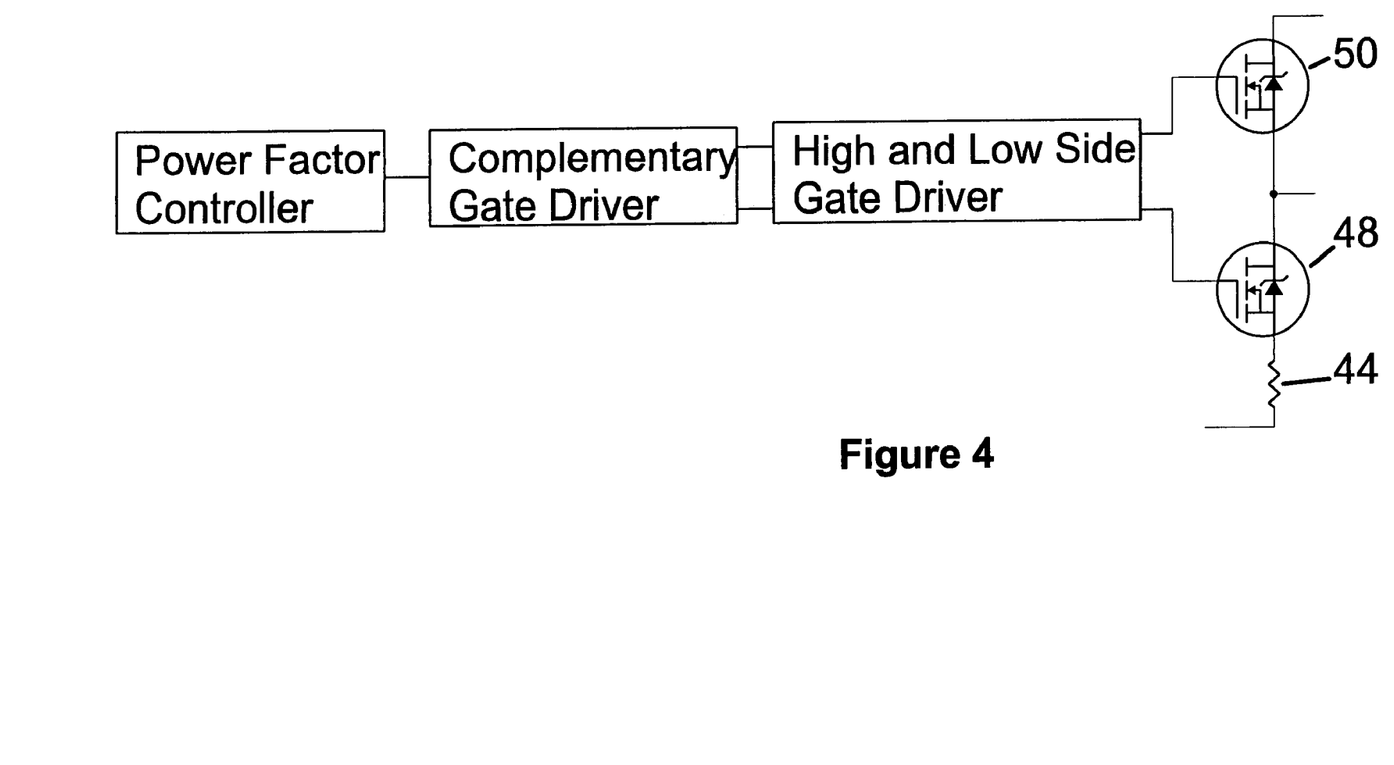
FIG. 4 is a block diagram of an implementation of the gate drivers for the main switch 48 (also 48a and 48b) and active clamp switch 50 (also 50a and 50b).

Active Clamp Implementation:

Power factor control is easily implemented with a variety of integrated circuits available from numerous vendors. However, many Power Factor Control IC's with desirable characteristics, including single cycle control, have only one gate drive output. The active clamp technique requires complementary gate drive signals for both the main switch and clamp switch. A number of ways of generating this second clamp switch drive are possible. An embodiment shown in FIG. 4 employs a second IC (Complementary Gate Driver) specifically designed to generate the complementary gate drive signals. An example of such an IC is the Texas Instruments UC3715. The UC3715 does not have a floating gate drive to drive the clamp switch. A third IC such as the International Rectifier IR 2113 can be used to drive the gates of both switches. It also has a higher gate drive current capability that the UC3715. In the future, an IC that combines single cycle control with active clamp gate driving circuitry will make it easier to implement this control function.

The invention comprises an amplifier such as amplifiers 26, 60, or 62 of FIGS. 1, 2, 3, respectively, with DC power supplied by a power converter utilizing a current fed topology and an active clamp snubber. In addition the supply can use a regulated bias supply to eliminate the use of an optocoupler and its associated circuitry. FIG. 2 illustrates a preferred embodiment of the present invention. The associated amplifier power supply uses a current fed topology. This allows the secondary winding of transformer 34 of the power supply to deliver current directly into capacitors 24 without an intervening buck inductor. In addition, the associated power supply will incorporate an active clamp snubber including switch active clamp switch 50 and clamp capacitor 52. This controls the turn off voltage stress on main switch 48, and can be configured to reduce the turn on loss of main switch 48 as well. The reduction in current and voltage changes over time also reduces electromagnetic emissions and output diode 58 turn off losses as well.

The power supply embodiments of the present invention as used to power amplifiers, in particular audio amplifiers, are novel and have numerous benefits as previously explained. Any of the topologies shown in FIGS. 1, 2, and 3 all contain these novel elements. The scope of the claims is not limited to these examples.

Figure 5:
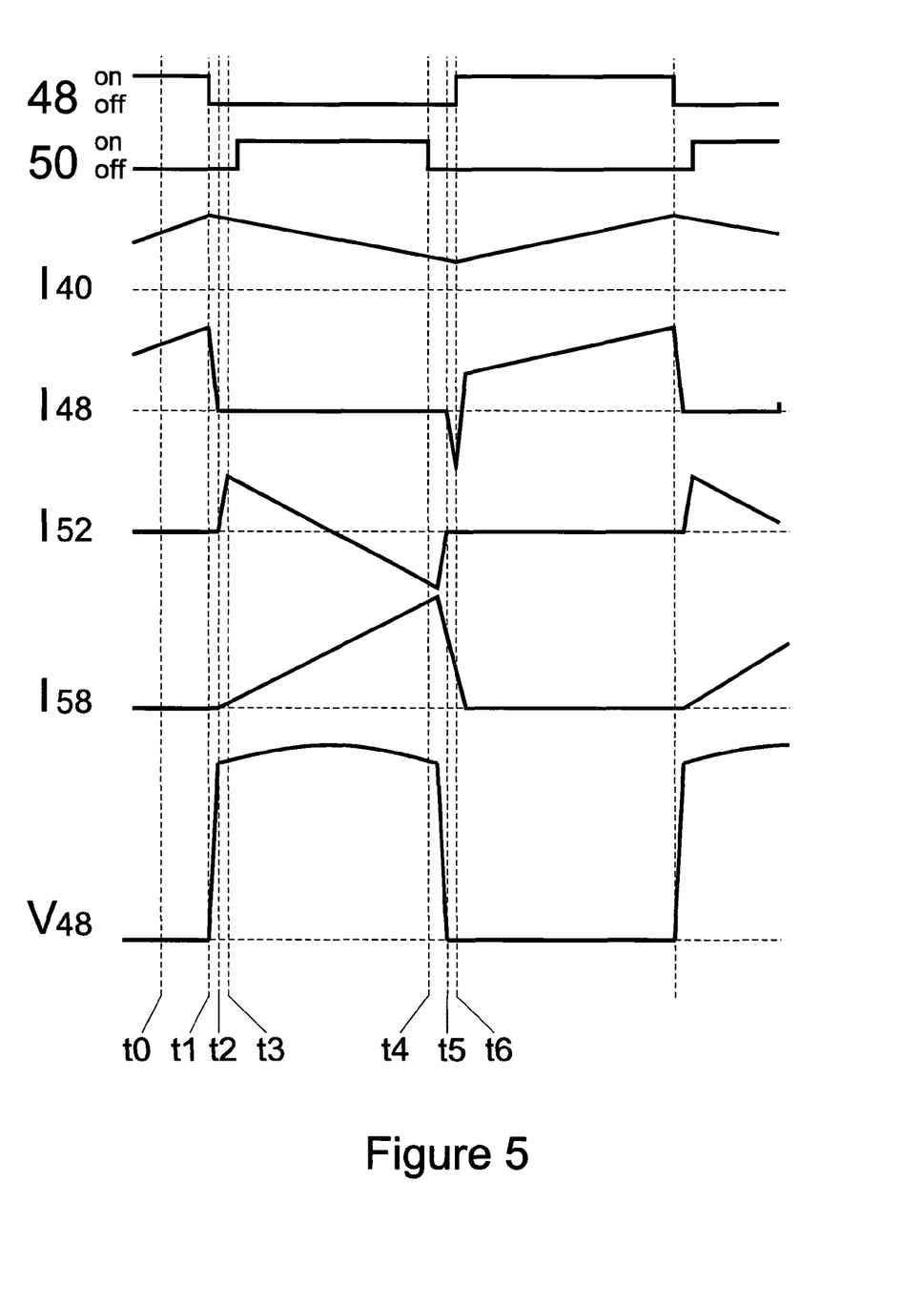
FIG. 5 shows typical waveforms encountered in the operation of a current fed converter with an active clamp snubber for the embodiments of FIGS. 1 and 2.

With reference to the waveform chart of FIG. 5, for the embodiments of FIGS. 1 and 2 at t0, main switch 48 is on and active clamp switch 50 is off. Current is increasing through boost inductor 40 (FIG. 1), input bridge rectifier 28, and main switch 48. Magnetizing current from transformer 34 is going through main switch 48 as well. At t1 main switch 48 turns off. Current flows into the parasitic capacitance of switch 48 until t2 when its voltage exceeds that at clamp capacitor 52. At t2 active clamp switch 50 diode conducts, and transformer 34 leakage inductance sees the voltage at clamp capacitor 52. Current then rises through transformer 34 leakage inductance as it resonates with clamp capacitor 52. Shortly after active clamp switch 50 diode conducts, active clamp switch 50 is turned on at t3. This allows current to flow back to the leakage inductance of transformer 34 as it resonates with clamp capacitor 52. This resonant frequency is chosen to be less than the switching frequency to ensure that the current through transformer 34 is rising through out the off time of main switch 48. The voltage at clamp capacitor 52 varies to maintain charge balance under all operating conditions. At t4, active clamp switch 50 is turned off. The leakage inductance of transformer 34 then pulls current through the parasitic capacitance of clamp switch 50, the parasitic capacitance of switch 48, and any parasitic capacitances on boost inductor 40 and transformer 34. This causes the voltage on the parasitic capacitance of switch 48 to decrease until it goes negative and main switch 48 diode turns on at t5. Shortly thereafter main switch 48 is turned on at t6 and the cycle repeats.

Turn on dissipation is very low as the parasitic capacitance of main switch 48 is already completely discharged at t6. Those skilled in the art will recognize that at light loads the energy stored in the leakage inductance of transformer 34 may be insufficient to discharge the parasitic capacitance of main switch 48 and some turn on dissipation will occur. However, conduction losses are generally much lower under these conditions so total dissipation remains low. The value of the leakage inductance of transformer 34 may be varied by changes in transformer 34 construction and by adding an external inductor in series with transformer 34 primary.

Note that an active clamp improves the operation of a two inductor isolated boost topology shown in FIG. 3. The balancing transformer 66 of the embodiment of FIG. 3 allows a two inductor isolated boost topology to work at very light loads. This is essential for audio amplifier use, where a very light load is a common operating condition. The operation of the embodiment of the invention of FIG. 3 will now be described in greater detail with reference to the waveform chart of FIG. 6.

Figure 6:
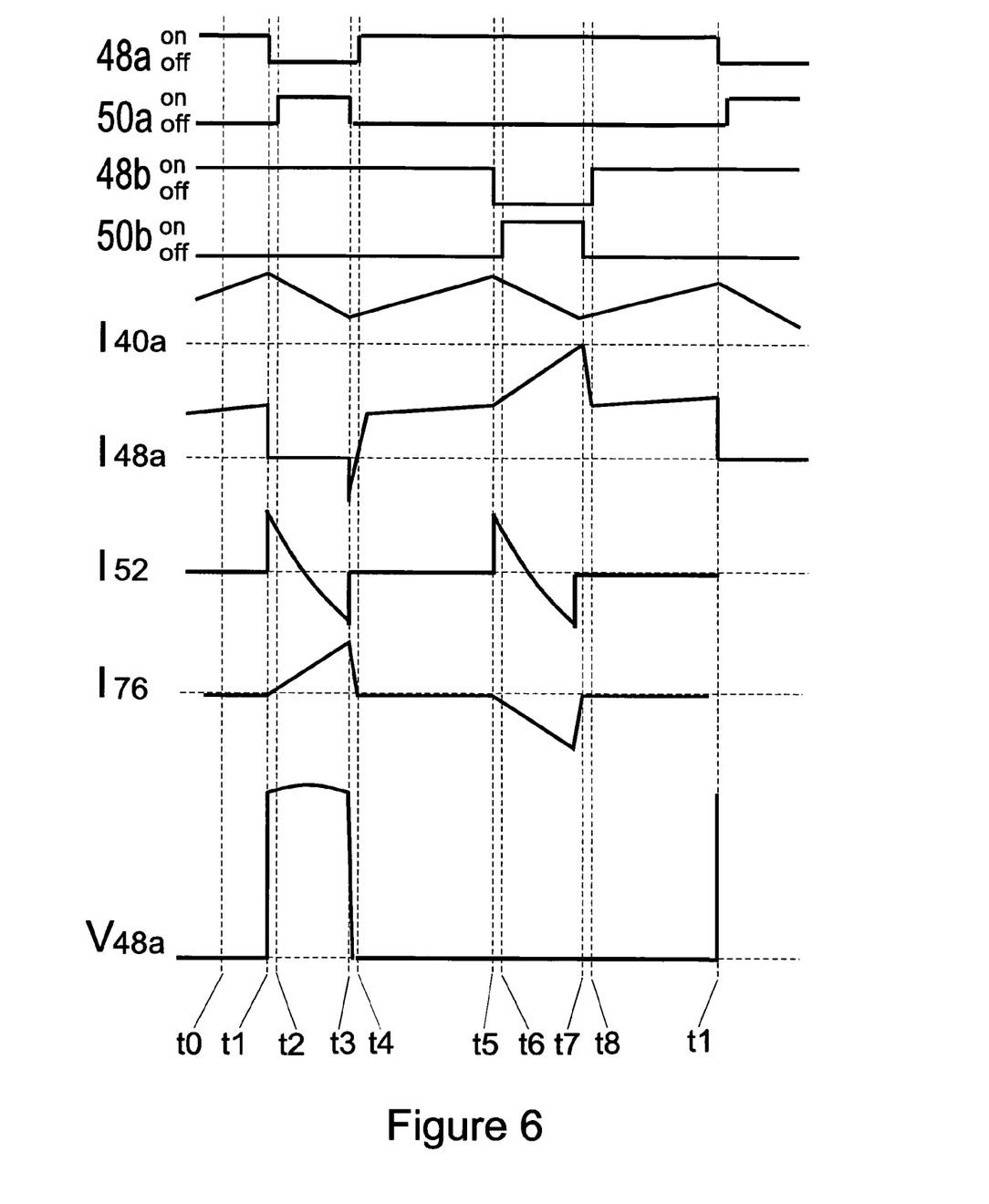
FIG. 6 shows a waveform chart relative to the embodiments of FIG. 3.

At time t0 switches 48a and 48b are on. Current is increasing through boost inductors 40a and 40b. There is no current through the primary of transformer 34. Switches 50a and 50b are closed and no current is flowing in clamp capacitor 52. At time t1, switch 48a closes. The current in boost inductor 40a is diverted through active clamp switch 50a into clamp capacitor 52. At time t2, active clamp switch 50a turns on under zero voltage conditions, with very little loss. The current in clamp capacitor 52 then swings negative as it resonates with the leakage inductance 76. As the resonant frequency of clamp capacitor 52 and leakage inductance 76 is less than the switching frequency, leakage inductance 76 and transformer 34 primary current increase at a nearly constant rate. During the t2 interval the balancing transformer 66 keeps the current from increasing, even though main switch 48b is on. In fact, inductors 40a and 40b are forced to have nearly identical circuits due the action of balancing transformer 66. At time t3 active clamp switch 50a turns off. The current through leakage inductance 76 is diverted from clamp capacitor 52 to the body diode of main switch 48a. At time t4, main switch 48a is turned on under zero voltage conditions, greatly lowering its switching losses. As the leakage inductance now sees the reflected voltage of the secondary, its current level rapidly declines. However the di/dt is reduced by the leakage inductance, and so the turn off losses in the output diodes 58 are greatly reduced. Also note the triangular shape of the transformer 34 winding currents. This reduces emissions and transformer losses as compared to the more rectangular waveforms of isolated boost converters without an active clamp circuit.

Although various embodiments of the invention have been shown and described, they are not meant to be limiting. Those of ordinary skill in the art may recognize certain modifications to the embodiments, which modifications are meant to be covered by the spirit and scope of the appended claims.

What is claimed is:

1. An amplifier with a switchmode power supply comprising:
  an amplification means;
  a power supply for said amplification means;
  the power supply utilizing a current fed topology;
  the current fed topology comprising:
    a source of rectified direct current voltage;
    at least one inductor with one end connected to the voltage source;
    at least one main switch connected in series with the inductor and voltage source;
    an isolation transformer having a primary and at least one secondary winding;
    said transformer primary being connected to the junction of said main switch and inductor, whereby the main switch closing allows current to increase through the inductor and voltage source, the main switch opening diverting the inductor current into the transformer, allowing the inductor to supply energy to the secondary winding;
    at least one rectifier and energy storage capacitor connected to a transformer secondary, as the current is limited by the inductor, no inductors are used between the rectifier and energy storage capacitor;
  said power supply utilizing an active clamp snubber;
  said active clamp snubber comprising:
    an auxiliary switch in parallel with a diode;
    a clamp capacitor;
    the auxiliary switch and diode anode being connected to the junction of the primary winding and the main switch;
    the clamp capacitor being connected to the auxiliary switch and diode cathode, the other end of the capacitor being connected to the source of rectified direct current voltage;
    the main switch being turned on a short time after the auxiliary switch is turned off;
    the main switch being turned off a short time before the auxiliary switch is turned on, such that the main switch and auxiliary switch are turned on when there is little voltage across them;
  the power supply utilizing a control means; and
  the control means operating and connected in such a way as to maintain a constant voltage across the energy storage capacitor, and to force the input current to be proportional to the input voltage.

2. The invention of claim 1 wherein a bias supply winding is wound on the transformer;
  wherein the bias supply winding is connected to a rectifier and bias capacitor;
  the bias capacitor supplying power to the control means;
  the control means detecting and controlling the voltage on the bias capacitor; and
  the control means turning off all switches when the bias capacitor voltage drops below a certain value.

* * * * *